US011984290B2

United States Patent
Niehoff et al.

(10) Patent No.: US 11,984,290 B2
(45) Date of Patent: May 14, 2024

(54) CIRCUIT BREAKER

(71) Applicants: Eaton Intelligent Power Limited, Dublin (IE); DIRECT CURRENT B.V, Aalsmeer (NL)

(72) Inventors: Ronald Niehoff, Oldenzaal (NL); Harry Stokman, Aalsmeer (NL)

(73) Assignee: EATON INTELLIGENT POWER LIMITED, Dublin (IE)

( * ) Notice: Subject to any disclaimer, the term of this patent is extended or adjusted under 35 U.S.C. 154(b) by 346 days.

(21) Appl. No.: 17/435,055

(22) PCT Filed: Feb. 20, 2020

(86) PCT No.: PCT/EP2020/054428
§ 371 (c)(1),
(2) Date: Aug. 31, 2021

(87) PCT Pub. No.: WO2020/178032
PCT Pub. Date: Sep. 10, 2020

(65) Prior Publication Data
US 2022/0139644 A1 May 5, 2022

(30) Foreign Application Priority Data
Mar. 6, 2019 (GB) .................. 1903018

(51) Int. Cl.
*H02H 9/00* (2006.01)
*H01H 9/54* (2006.01)
*H02H 9/02* (2006.01)

(52) U.S. Cl.
CPC .............. *H01H 9/548* (2013.01); *H02H 9/02* (2013.01)

(58) Field of Classification Search
None
See application file for complete search history.

(56) References Cited

U.S. PATENT DOCUMENTS 6,327,162 B1 * 12/2001 Larsen .................. H02J 3/1814
307/64
2013/0329329 A1 12/2013 Liu et al.
2014/0313628 A1 10/2014 Häfner et al.
(Continued)

FOREIGN PATENT DOCUMENTS

CN 105680411 A 6/2016
CN 106711930 A 5/2017
EP 2410551 A2 1/2012
(Continued)

*Primary Examiner* — Stephen W Jackson
(74) *Attorney, Agent, or Firm* — LEYDIG, VOIT & MAYER. LTD.

(57) ABSTRACT

A hybrid circuit breaker for interrupting a current in an electrical circuit line, the hybrid circuit breaker includes an input terminal for connection to a power line and an output terminal for connection to a DC system, a first solid state switching device connected to the input terminal, and a mechanical isolator relay arranged in series with the first solid state switching device and connected to the output terminal. The hybrid circuit breaker further includes a crowbar circuit electrically connected between the output terminal and ground or mid-pole, and a controller for controlling the first solid state switching device, the mechanical isolator relay and the crowbar circuit.

10 Claims, 2 Drawing Sheets

(56) References Cited

U.S. PATENT DOCUMENTS

2015/0002977 A1 1/2015 Dupraz et al.
2016/0322809 A1 11/2016 Wang et al.

FOREIGN PATENT DOCUMENTS

| JP | 2016167406 A | 9/2016 |
| WO | WO 2007006021 A1 | 1/2007 |
| WO | WO 2017220443 A1 | 12/2017 |

* cited by examiner

CIRCUIT BREAKER

CROSS-REFERENCE TO PRIOR APPLICATIONS

This application is a U.S. National Phase application under 35 U.S.C. § 371 of International Application No. PCT/EP2020/054428, filed on Feb. 20, 2020, and claims benefit to British Patent Application No. GB 1903018.8, filed on Mar. 6, 2019. The International Application was published in English on Sep. 10, 2020 as WO 2020/178032 under PCT Article 21(2).

FIELD

The invention relates to a hybrid circuit breaker for interrupting a current in an electrical circuit line.

BACKGROUND

A hybrid circuit breaker is for example known from U.S. Pat. No. 4,618,906. This publication discloses a hybrid solid state/mechanical switch, which has a mechanical switch and a circuit breaking device, such as a fuse, arranged in series in the electrical circuit line. The mechanical switch is typically operated to break the circuit upon the occurrence of a short in the DC system.

However, if the mechanical switch fails to break the circuit, a crowbar circuit, arranged between the fuse and the mechanical switch, is operated to cause the fuse to blow.

WO 2017220443 discloses a hybrid circuit breaker, in which both electrical lines are interrupted by a mechanical switch. Mechanical switches have a number of disadvantages when used as a circuit breaker for DC systems. The opening of a mechanical switch takes a relative long time and during opening arcing can occur between the mechanical contacts of the switch.

In particular with DC systems operating at voltages over 200V DC, a fast circuit breaking is necessary, typically below 10 milliseconds and more preferred in the range of 1-3 milliseconds, when for example a direct touch contact occurs. A mechanical switch is for such required fast switching times too slow.

Furthermore, the use of a mechanical switch can lead to arcing during opening of the switch, as already identified in the closest prior art. On the other hand, a mechanical switch does provide a reliable interruption of a circuit.

Semiconductor switches do not have the disadvantages of mechanical switches and have the advantage that switching times are generally substantially faster compared to mechanical switches. However, semiconductor switches do dissipate energy and are not allowed by industry standards to isolate a DC system.

Within a DC system multiple sources could be present, such that breaking the connection with one source does not necessarily provides a safe DC system.

SUMMARY

In an embodiment, the present invention provides a hybrid circuit breaker for interrupting a current in an electrical circuit line, the hybrid circuit breaker comprising: an input terminal for connection to a power line and an output terminal for connection to a DC system; a first solid state switching device connected to the input terminal; a mechanical isolator relay arranged in series with the first solid state switching device and connected to the output terminal; a crowbar circuit electrically connected between the output terminal and ground or mid-pole; and a controller for controlling the first solid state switching device, the mechanical isolator relay and the crowbar circuit.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
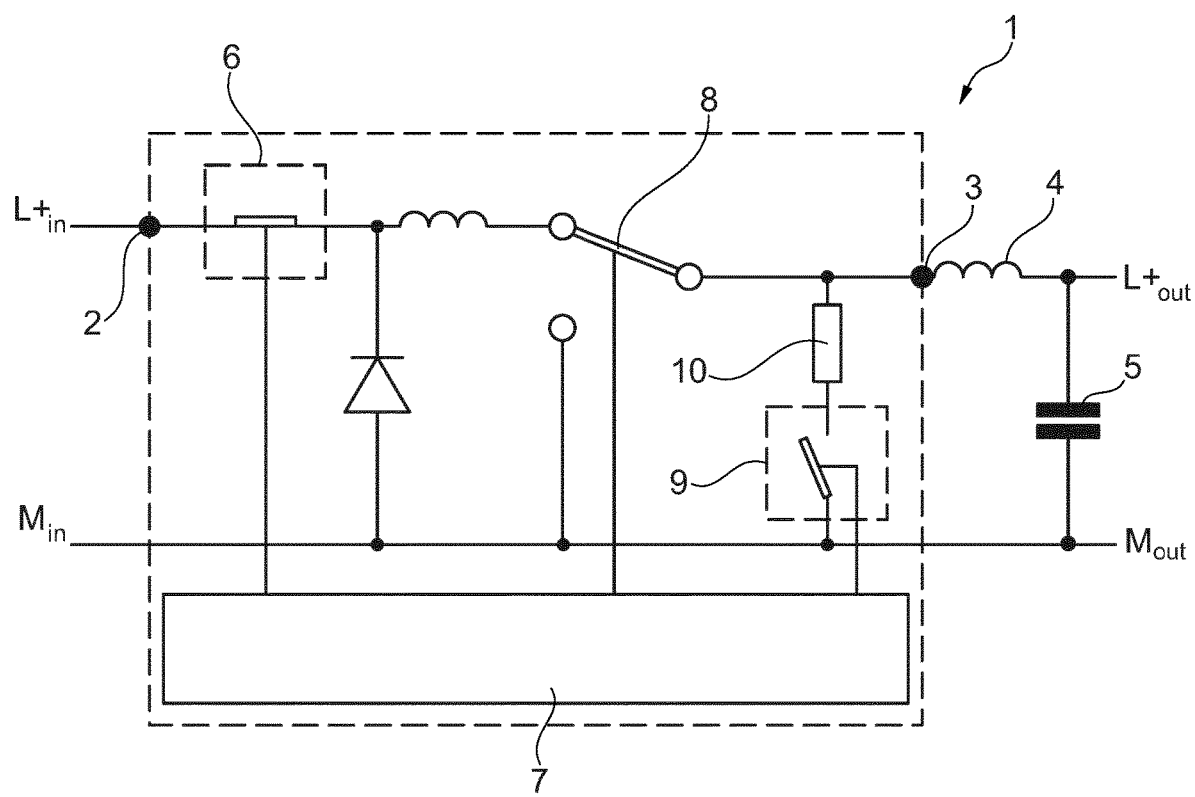
FIG. 1 shows an embodiment of the hybrid circuit breaker according to the invention in a first state.

Embodiments of the present invention to reduce or even remove the above mentioned disadvantages.

With the hybrid circuit breaker according to the invention, the first solid state switching device allows for a fast interruption of the power to the DC system. The crowbar circuit allows for the discharge and shortening of the DC system, such that no current flows through the mechanical isolator relay and the mechanical isolator relay can be opened to provide a reliable interruption of the circuit.

The controller allows for a controlled actuation of the first solid state switching device, the crowbar circuit and the mechanical isolator relay, such that the hybrid circuit breaker can quickly interrupt the power supply to the DC system and also the power supply can be switched back on reliably.

When, for example, a short occurs in the DC system, the controller will control the first solid state switching device and the mechanical isolator relay to an open position, while the crowbar circuit is simultaneously activated. As the switching time of the solid state switching device and the crowbar circuit are substantially shorter, substantial less or no current will flow through the mechanical isolator relay when it starts to open. This will reduce or prevent any arcing in the mechanical isolator relay.

In a preferred embodiment of the hybrid circuit breaker according to the invention the mechanical isolator relay connects in a connected position the first solid state switching device with the output terminal and connects in a disconnected position the output terminal to ground or mid-pole.

By connecting the output terminal by the isolator relay breaker to ground or mid-pole additional safety is provided. This allows the hybrid circuit breaker also to be used to disconnect the DC system from the power supply for maintenance to the DC system.

In yet another embodiment of the hybrid circuit breaker according to the invention the crowbar circuit comprises arranged in series a second solid state switching device and a resistor.

With the second solid state switching device a quick activation of the crowbar circuit is obtained, within the same time range as the first solid state switching device and well ahead of the switching time of the mechanical isolator relay.

Preferably, the solid state switching device, either the first and/or the second, comprises a semiconductor like a FET, MOSFET or IGBT.

In yet a further embodiment of the hybrid circuit breaker according to the invention, the controller comprises a current sensor for sensing an overcurrent or short circuit in the DC system.

With the current sensor the current in the electrical circuit line is measured and when the current exceeds a threshold, the controller controls the first solid state switching device, the crowbar circuit and the mechanical isolator relay to switch off the power supply to the DC system and to prevent further damage by the exceeding current.

In still a further embodiment of the hybrid circuit breaker according to the invention the mechanical isolator relay is a double-pole relay of which a first pole is arranged between the first solid state switching device and the output terminal, the hybrid circuit breaker further comprising a second input terminal for connection to a mid-pole line and a second output terminal for connection to a DC system, wherein the second pole is electrically arranged between the second input terminal and the second output terminal.

By also breaking the mid-pole line of the DC system further safety is obtained.

FIG. 1 shows an embodiment of an hybrid circuit breaker 1 according to the invention during normal use. The hybrid circuit breaker 1 has an input terminal 2 connected to a DC power source and an output terminal 3 connected to a DC system 4, 5 schematically depicted as a coil 4 and capacitor 5.

The hybrid circuit breaker 1 has furthermore a first solid state switching device 6 connected to the input terminal 2. This solid state switching device 6 comprises preferably a semiconductor like a FET, MOSFET or IGBT, which is controlled by a controller 7. A mechanical isolator relay 8 is arranged in series with the first solid state switching device 6 and connected to the output terminal 3. Also the mechanical isolator relay 8 is controlled by the controller 7.

Furthermore, a crowbar circuit, comprising arranged in series a second solid state switching device 9 and a resistor 10, is arranged between the output terminal 3 and ground. The second solid state switching device 9, preferably a semiconductor like a FET, MOSFET or IGBT, is also controlled by the controller 7.

In FIG. 1 the hybrid circuit breaker 1 is shown during normal use in which the DC system 4, 5 is supplied with power from the DC power source. To this end, the first semiconductor switch 6 and the mechanical isolator relay 8 are controlled by the controller 7 to an electrically closed position, while the second semiconductor switch 9 is kept in an electrically open position.

Figure 2:
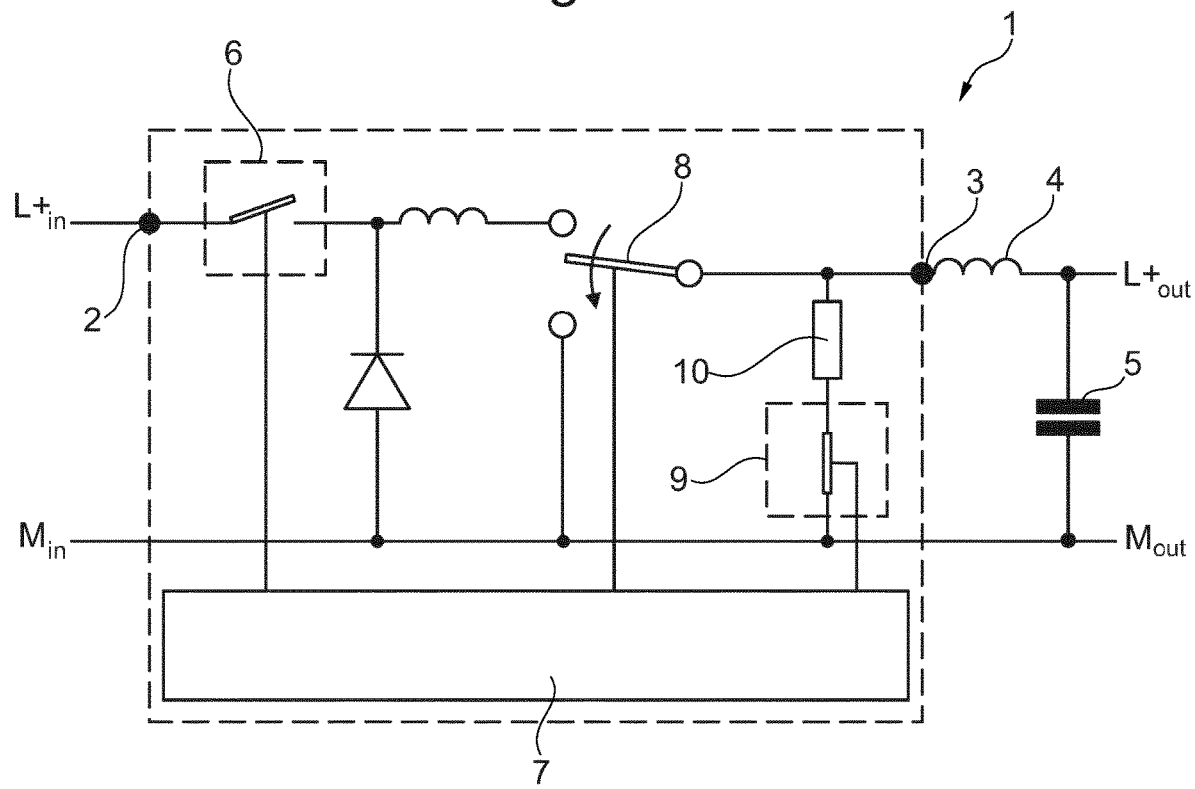
FIG. 2 shows an embodiment of the hybrid circuit breaker according to the invention in a second state.

FIG. 2 shows the hybrid circuit breaker 1 in case a short is detected by the controller 7. In such an occasion the controller 7 will control the first semiconductor switch 6 and the mechanical isolator relay 8 to an electrically open position and the second semiconductor switch 9 to an electrically closed position.

Opening the semiconductor switch 6 will cut off the power supply to the DC system 4, 5. The closing of the second semiconductor switch 9 will activate the crowbar circuit 9, 10 such that any energy in the DC system 4, 5 will be drained to ground.

As the power supply is cutoff and the crowbar circuit 9, 10 is activated the mechanical circuit breaker 8 is isolated, such that during the opening cycle, which takes substantial more time than opening or closing the semiconductor switches 6, 9, no arcing can take place.

Figure 3:
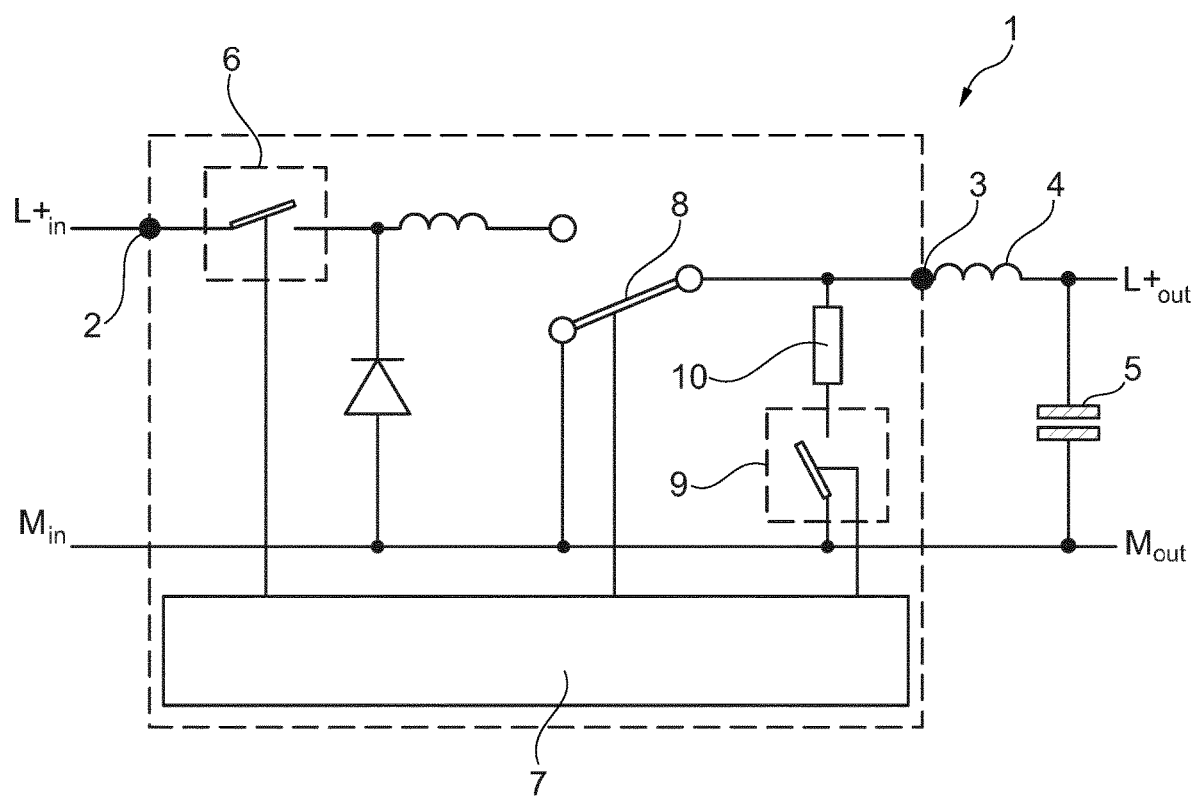
FIG. 3 shows and embodiment of the hybrid circuit breaker according to the present invention in a third state.

FIG. 3 shows the hybrid circuit breaker 1 after the opening cycle of the mechanical isolator relay 8 has completed. To provide additional safety, for example during maintenance of the DC system 4, 5, the mechanical isolator relay 8 connects the output terminal 3 to ground the open position of the circuit breaker 8.

Once the mechanical isolator relay 8 is in the full open position, the first and second semiconductor switches 6, 9 could be controlled to an electrically open position if desired.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A hybrid circuit breaker for interrupting a current in an electrical circuit line, the hybrid circuit breaker comprising:
   an input terminal for connection to a power line and an output terminal for connection to a DC system;
   a first solid state switching device connected to the input terminal;
   a mechanical isolator relay arranged in series with the first solid state switching device and connected to the output terminal;
   a crowbar circuit electrically connected between the output terminal and ground or mid-pole; and
   a controller for controlling the first solid state switching device, the mechanical isolator relay and the crowbar circuit,
   wherein the crowbar circuit comprises a second solid state switching device and a resistor arranged in series.

2. The hybrid circuit breaker according to claim 1, wherein the mechanical isolator relay connects in a connected position the first solid state switching device with the output terminal and connects in a disconnected position the output terminal with ground or mid-pole.

3. The hybrid circuit breaker according to claim 1, wherein the solid state switching device comprises a semiconductor.

4. The hybrid circuit breaker according to claim 1, wherein the controller comprises a current sensor for sensing a short in the DC system.

5. The hybrid circuit breaker according to claim 1, wherein the mechanical isolator relay is a double-pole isolator relay of which a first pole is arranged between the first solid state switching device and the output terminal, the hybrid circuit breaker further comprising a second input terminal for connection to a mid-pole line and a second output terminal for connection to a DC system, wherein the second pole is electrically arranged between the second input terminal and the second output terminal.

6. A hybrid circuit breaker for interrupting a current in an electrical circuit line, the hybrid circuit breaker comprising:
- an input terminal for connection to a power line and an output terminal for connection to a DC system;
- a first solid state switching device connected to the input terminal;
- a mechanical isolator relay arranged in series with the first solid state switching device and connected to the output terminal;
- a crowbar circuit electrically connected between the output terminal and ground or mid-pole; and
- a controller for controlling the first solid state switching device, the mechanical isolator relay and the crowbar circuit, wherein the mechanical isolator relay is a double-pole isolator relay of which a first pole is arranged between the first solid state switching device and the output terminal, the hybrid circuit breaker further comprising a second input terminal for connection to a mid-pole line and a second output terminal for connection to a DC system, wherein the second pole is electrically arranged between the second input terminal and the second output terminal.

7. The hybrid circuit breaker according to claim 6, wherein the mechanical isolator relay connects in a connected position the first solid state switching device with the output terminal and connects in a disconnected position the output terminal with ground or mid-pole.

8. The hybrid circuit breaker according to claim 6, wherein the crowbar circuit comprises a second solid state switching device and a resistor arranged in series.

9. The hybrid circuit breaker according to claim 6, wherein the solid state switching device comprises a semiconductor.

10. The hybrid circuit breaker according to claim 6, wherein the controller comprises a current sensor for sensing a short in the DC system.

\* \* \* \* \*